March 3, 1942.          R. J. RAY          2,275,315
MEANS FOR ATTACHING FRAGILE BODIES TO A SUPPORT
Filed Jan. 2, 1940
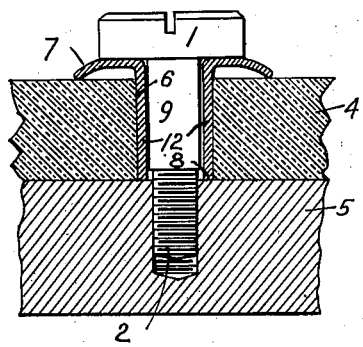
Inventor
Reginald John Ray
By B. Singer, atty.

Patented Mar. 3, 1942

2,275,315

UNITED STATES PATENT OFFICE 2,275,315

MEANS FOR ATTACHING FRAGILE BODIES TO A SUPPORT

Reginald John Ray, Ashfield, near Sydney, New South Wales, Australia

Application January 2, 1940, Serial No. 312,141
In Australia January 12, 1939

2 Claims. (Cl. 85—50)

The object of this invention is to provide means by which any substances fragile, or liable to fracture and/or distortion may be attached to, or joined with a supporting body, hereinafter called a support, in such a manner that the pressure or force exerted by the joining or fastening means, or the pressure or force exerted during the fastening operation, or any adhesion of said means to the fragile substances, may not exceed a predetermined magnitude beyond the fracture and/or distortion point of the aforesaid substances whereby fracture and/or distortion of said substances are prevented or reduced to a minimum.

The means according to the invention are hereinafter described, by way of example, with reference to the accompanying drawing which shows a preferred form of said means, in sectional view.

The device as shown comprises a screw bolt having a head 1 and a shank 9 with a threaded end 2 thereon. The said bolt is passed with its shank through an aperture 6 formed in the fragile plate 4 to be fixed to a supporting plate 5, and screwed into the said supporting plate. A metal sleeve 12 embraces the shank 9 in the aperture 6 and rests with its lower end 8 on the supporting plate 5. The opposite end of sleeve 12 is formed with a convex resilient flange 7 the inner edge of which contacts the underside of head 1 of the screw bolt, whereas its outer edge is adapted to bear on the upper face of the fragile plate 4.

If desired, flange 7 may be cut radially to form a series of elastic fingers whereby the resiliency of flange 7 is increased.

When the screw bolt according to the drawing is screwed into the supporting member 5 the pressure between the head 1 and the supporting plate is taken up by the sleeve 12, resting with its end 8 on said supporting plate, whereas the fastening pressure exerted on the fragile plate 4 is limited by the elastic characteristic, size, and configuration of said resilient flange 7. Provided the sleeve 12 can withstand it without collapsing, any excessive pressure or force exerted on the head 1 is directly transmitted by the said sleeve onto the supporting plate 5 only and is, with certainty, kept off the fragile plate 4.

I wish it to be understood that I do not desire to be limited to the exact details of construction hereinbefore described with reference to the accompanying drawing, for obvious modifications will occur to a person skilled in the art. Thus the invention is not limited to the fastening of fragile plates (say glass or porcelain plates) to plane supporting members, but it may also be used for the fixation of optionally shaped fragile bodies of any description to any suitably shaped support. It will moreover be understood that the screw bolt may be replaced by a rivet, tack or other suitable fixation means having the features hereinbefore described, and that a sleeve of any suitable resilient and pressure resisting material, or a flanged sleeve composed of two or more materials, may be used instead of the metal sleeve as hereinbefore described with reference to the accompanying drawing, without departing from the essence of my invention.

I claim:

1. Means for attaching a fragile body to a support, comprising a fixation bolt formed with a head, and with a shank to be fixed to the support in any suitable manner, a sleeve embracing said shank and adapted to be passed through an aperture formed in the fragile body, the length of said sleeve exceeding the thickness of the fragile body to enable one end of said sleeve to engage the support, and an elastic flange connected to the other end of said sleeve and adapted to be compressed between the head of the fixation bolt and the fragile body.

2. Means for attaching a fragile body to a support as claimed in claim 1, and in which said sleeve is formed integral with the elastic flange, and said flange is formed to convex shape.

REGINALD JOHN RAY.